United States Patent
Rotter et al.

(10) Patent No.: US 6,752,846 B2
(45) Date of Patent: Jun. 22, 2004

(54) PANEL TYPE AIR FILTER ELEMENT WITH INTEGRAL BAFFLE

(75) Inventors: Terrence M. Rotter, Sheboygan Falls, WI (US); Theodore E. Wehrman, Sheboygan, WI (US); Kevin G. Bonde, Kiel, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 10/198,859

(22) Filed: Jul. 18, 2002

(65) Prior Publication Data

US 2004/0011010 A1 Jan. 22, 2004

(51) Int. Cl.$^7$ .............................................. B01D 27/06
(52) U.S. Cl. ........................ 55/385.3; 55/497; 55/502; 55/503
(58) Field of Search ............................... 55/385.3, 497, 55/500, 502, 503

(56) References Cited

U.S. PATENT DOCUMENTS

| | | | |
|---|---|---|---|
| 1,172,612 A | 2/1916 | Kremer | |
| 1,301,007 A | 4/1919 | Roof | |

(List continued on next page.)

FOREIGN PATENT DOCUMENTS

| | | | |
|---|---|---|---|
| DE | 3120190 A1 | 5/1982 | |
| GB | 355365 | 8/1931 | |
| GB | 378216 | 8/1932 | |
| WO | WO 86/04122 A1 | 7/1986 | |
| WO | WO 00/43655 A1 | 7/2000 | |

OTHER PUBLICATIONS

"Technical Innovations–Briggs & Stratton extends engine life", SAE Off–Highway Engineering, Oct. 2001, p. 4.

3 undated photographs of Briggs & Stratton balance system, admitted prior art.
Marketing literature concerning Briggs & Stratton AVS system, 2001 (2 pages).
Notes and photographs concerning Balance System of Briggs & Stratton shown at Louisville trade show in Jul., 2001 ( 3 pages of notes, 2 pages of photographs).
Information concerning gerators, obtained at www.vianenterprises.com, printed Mar. 2, 2002 (4 pages).
Information concerning crescent pumps, obtained at www.animatedsoftware.com, printed Jul. 2, 2001 (1 page).
"Gerotor Lubricating Oil Pump for IC Engines", S. Manco et al., SAE Intn'l FL98 (San Francisco) (17 pages).
Undated photographs of Kohler Command–Single Automatic Compression Release mechanism, admitted prior art (1 page).
Undated photographs of Briggs & Stratton Automatic Compression Release mechanism, admitted prior art (1 page).
Undated photographs of Honda OHC Automatic Compression Release mechansim and cam follower, admitted prior art (3 pages).

*Primary Examiner*—Robert A. Hopkins
(74) *Attorney, Agent, or Firm*—Quarles & Brady LLP

(57) ABSTRACT

An air filter and corresponding filter element for use in an internal combustion engine are disclosed. The filter element has a seal bead made of an elastomeric material that forms the frame of the filter element. A pleat block, made of a filter media, is molded into the seal bead in a first area of the filter element and a baffle is located in a second area of the filter element to protect the pleat block from wetting. A channel is formed in one side of the seal bead which allows the filter element to be retained during assembly without the use of fasteners and a surface is formed opposite the seal bead that in conjunction with the channel seals the filter element within the air filter when the air filter is fully assembled. The air filter has an intake silencing chamber that is located to receive outside air before it is provided to the pleat block and a sealed flow path is created from the intake silencing chamber to the pleat block by a third area of the filter element.

27 Claims, 4 Drawing Sheets

U.S. PATENT DOCUMENTS

| | | |
|---|---|---|
| 1,410,019 A | 3/1922 | Krause |
| 1,469,063 A | 9/1923 | Wills |
| 1,590,073 A | 6/1926 | Birkigt |
| 1,684,955 A | 9/1928 | Goodwin |
| 2,235,160 A | 3/1941 | Ljungstrom |
| 2,459,594 A | 1/1949 | Smith |
| 3,118,433 A | 1/1964 | Lechtenberg |
| 3,195,526 A | 7/1965 | Jordan |
| 3,200,804 A | 8/1965 | Hensler et al. |
| 3,314,408 A | 4/1967 | Fenton |
| 3,407,741 A | 10/1968 | Weber et al. |
| 3,457,804 A | 7/1969 | Harkness |
| 3,561,416 A | 2/1971 | Kiekhaefer |
| 3,751,080 A | 8/1973 | Bailey et al. |
| 3,818,577 A | 6/1974 | Bailey et al. |
| 4,030,179 A | 6/1977 | Schwarz |
| 4,097,702 A | 6/1978 | Halsted |
| 4,185,717 A | 1/1980 | Ford, Jr. et al. |
| 4,198,879 A | 4/1980 | Hornak et al. |
| 4,283,607 A | 8/1981 | Brightman |
| 4,285,309 A | 8/1981 | Johansson |
| 4,308,830 A | 1/1982 | Yamada et al. |
| 4,332,222 A | 6/1982 | Papez |
| 4,336,777 A | 6/1982 | Yanagihara et al. |
| 4,366,787 A | 1/1983 | Gale |
| 4,372,258 A | 2/1983 | Iwai |
| 4,380,216 A | 4/1983 | Kandler |
| 4,391,231 A | 7/1983 | TateBe et al. |
| 4,401,067 A | 8/1983 | Honda |
| 4,414,934 A | 11/1983 | Vogl et al. |
| 4,422,348 A | 12/1983 | Campbell |
| 4,433,651 A | 2/1984 | Nakakita et al. |
| 4,446,828 A | 5/1984 | Bauder et al. |
| 4,452,194 A | 6/1984 | Watanabe |
| 4,458,555 A | 7/1984 | Holtzberg et al. |
| 4,507,917 A | 4/1985 | Kandler |
| 4,510,897 A | 4/1985 | Hatz et al. |
| 4,530,318 A | 7/1985 | Semple |
| 4,534,241 A | 8/1985 | Remmerfelt et al. |
| 4,548,253 A | 10/1985 | Funatani et al. |
| 4,569,109 A | 2/1986 | Fetouh |
| 4,570,584 A | 2/1986 | Uetsuji et al. |
| 4,617,122 A | 10/1986 | Kruse et al. |
| 4,622,933 A | 11/1986 | Fukuo et al. |
| 4,644,912 A | 2/1987 | Umeha et al. |
| 4,656,981 A | 4/1987 | Murata et al. |
| 4,660,512 A | 4/1987 | Binder et al. |
| 4,672,930 A | 6/1987 | Sumi |
| 4,674,455 A | 6/1987 | Tsuboi |
| 4,684,267 A | 8/1987 | Fetouh |
| 4,688,446 A | 8/1987 | Ishikawa |
| 4,691,590 A | 9/1987 | Geringer et al. |
| 4,696,266 A | 9/1987 | Harada |
| 4,711,823 A | 12/1987 | Shiina |
| 4,736,717 A | 4/1988 | Fujikawa et al. |
| 4,793,297 A | 12/1988 | Fujii et al. |
| 4,802,269 A | 2/1989 | Mukai et al. |
| 4,819,592 A | 4/1989 | van Ligten |
| 4,819,593 A | 4/1989 | Bruener et al. |
| 4,822,414 A | 4/1989 | Yoshikawa et al. |
| 4,828,632 A | 5/1989 | Adam et al. |
| 4,834,784 A | 5/1989 | Bidanset |
| 4,836,045 A | 6/1989 | Lobig |
| 4,838,909 A | 6/1989 | Bidanset |
| 4,853,179 A | 8/1989 | Shiina |
| 4,861,359 A * | 8/1989 | Tettman ................... 55/419 |
| 4,867,806 A | 9/1989 | Shiina |
| 4,892,068 A | 1/1990 | Coughlin |
| 4,898,133 A | 2/1990 | Bader |
| 4,909,197 A | 3/1990 | Perr |
| 4,926,814 A | 5/1990 | Bonde |
| 4,928,550 A | 5/1990 | Sakai et al. |
| 4,934,442 A | 6/1990 | Futamura et al. |
| 4,949,687 A | 8/1990 | Emmersberger |
| 4,958,537 A | 9/1990 | Diehl et al. |
| 4,964,378 A | 10/1990 | Tamba et al. |
| 4,986,224 A | 1/1991 | Zuffi |
| 5,002,023 A | 3/1991 | Butterfield et al. |
| 5,038,727 A | 8/1991 | Burns et al. |
| 5,057,274 A | 10/1991 | Futamura et al. |
| 5,085,184 A | 2/1992 | Yamada et al. |
| 5,152,264 A | 10/1992 | Evans |
| 5,163,341 A | 11/1992 | Murrish et al. |
| 5,197,422 A | 3/1993 | Oleksy et al. |
| 5,197,425 A | 3/1993 | Santi |
| 5,207,120 A | 5/1993 | Arnold et al. |
| 5,241,873 A | 9/1993 | Hormann |
| 5,243,878 A | 9/1993 | Santi |
| 5,265,700 A | 11/1993 | Santi |
| 5,282,397 A | 2/1994 | Harkness et al. |
| 5,323,745 A | 6/1994 | Sato et al. |
| 5,357,917 A | 10/1994 | Everts |
| 5,370,093 A | 12/1994 | Hayes |
| 5,375,571 A | 12/1994 | Diehl et al. |
| 5,421,297 A | 6/1995 | Tamba et al. |
| 5,463,809 A | 11/1995 | Hoffman et al. |
| 5,497,735 A | 3/1996 | Kern et al. |
| 5,555,776 A | 9/1996 | Gazza |
| 5,556,441 A | 9/1996 | Courtwright et al. |
| 5,560,333 A | 10/1996 | Genouille |
| 5,615,586 A | 4/1997 | Phillips et al. |
| 5,651,336 A | 7/1997 | Rygiel et al. |
| 5,711,264 A | 1/1998 | Jezek et al. |
| 5,809,958 A | 9/1998 | Gracyalny |
| 5,823,153 A | 10/1998 | Santi et al. |
| 5,863,424 A | 1/1999 | Lee |
| 5,887,678 A | 3/1999 | Lavender |
| 5,904,124 A | 5/1999 | Poehlman et al. |
| 5,964,198 A | 10/1999 | Wu |
| 5,979,392 A | 11/1999 | Moorman et al. |
| 5,988,135 A | 11/1999 | Moorman et al. |
| 5,993,580 A * | 11/1999 | Nakayama et al. ........ 156/62.6 |
| 6,006,721 A | 12/1999 | Shannon et al. |
| 6,047,667 A | 4/2000 | Leppanen et al. |
| 6,055,952 A | 5/2000 | Gau |
| 6,076,426 A | 6/2000 | Genouille |
| 6,109,230 A | 8/2000 | Watanabe et al. |
| 6,116,205 A | 9/2000 | Troxler et al. |
| 6,126,499 A | 10/2000 | Katayama et al. |
| 6,170,449 B1 | 1/2001 | Saiki et al. |
| 6,213,081 B1 | 4/2001 | Ryu et al. |
| 6,269,786 B1 | 8/2001 | Snyder et al. |
| 6,293,981 B1 | 9/2001 | Holderle et al. |
| 6,395,049 B2 | 5/2002 | Knodler et al. |
| 6,511,623 B1 * | 1/2003 | Ueda et al. ................. 264/161 |
| 6,568,540 B1 * | 5/2003 | Holzmann et al. .......... 210/445 |

* cited by examiner

PANEL TYPE AIR FILTER ELEMENT WITH INTEGRAL BAFFLE

FIELD OF THE INVENTION

The present invention relates to internal combustion engines. In particular, the present invention relates to air filters and filter elements used with internal combustion engines.

BACKGROUND OF THE INVENTION

Internal combustion engines use air filters as a low cost means of providing clean combustion air to small utility engines. Many engines currently use air filters with panel type filter elements. Panel type filter elements can provide a large amount of filtration surface area in a narrow package size and are generally low cost due to the simplicity of the panel design.

In its basic form, a panel type filter element consists of two components. The first component is a pleat block, which is a length of filter media that is alternately folded to form a rectangular block. The pleat block is used to provide filtration of the incoming air before the air reaches the carburetor.

The second component is a seal bead, which is formed of an elastomeric material such as urethane foam or plastisol. The seal bead acts as a frame for the filter element, holds the pleat block, and provides a seal when the filter element is assembled into the air filter. Conventional air filter designs use a pair of opposed rib-like surfaces, one on the air filter base and the other on the air filter cover, to seal the air filter by "pinching" the seal bead of the filter element between them. In addition, the filter element is retained in the air filter base by creating an interference fit between the outer perimeter of the seal bead and the inner perimeter of the outer wall of the air filter base. By adjusting the interference fit between the seal bead and the air filter base, the filter element can be retained in the air filter base without use of fasteners. Retention of the filter element in the air filter base is particularly useful for re-installing the air filter cover after servicing the filter element. The disadvantages of this method of retaining the filter element and sealing the air filter are the larger size and complex mold design for the air filter base created by having both the rib-like surface and the outer wall in the air filter base.

Typically, the pleat block is molded directly into the seal bead to create the complete filter element. In addition, a third component, a metal screen, is sometimes added to the filter element to provide rigidity and strength. The metal screen is typically also molded directly into the seal bead just in front of the pleat block.

Panel type filter elements are currently available in two basic designs. In the first design, the seal bead forms an internal area, which is generally rectangular in shape, and the internal area is completely filled by the pleat block. This type of filter element is placed in the air intake passage of the engine, typically just in front of the carburetor, where dirty intake air enters the filter element on one side and clean air exits on the other side and is provided to the carburetor.

In the second design, the seal bead forms two internal areas. The first internal area, as described above for the first design, is generally rectangular in shape and is completely filled by the pleat block. The second internal area formed by the seal bead is left open and does not contain a pleat block or any other filter material. The second internal area is generally used to seal previously cleaned air from the outside when the intake passageway of the engine must turn the air exiting the air filter 180° to reach the carburetor.

In order to take advantage of the compact design of panel type filter elements, it is often necessary to place the filter element directly in front of the inlet to the carburetor. However, the carburetor will generally "spit-back" fuel due to the reverse flow pulse of air formed when the intake valve closes. This "spit-back" of fuel wets the filter media of the pleat block and causes it to plug prematurely, which reduces the effective life of the filter element. Filter elements that are kept dry have a tendency to self-clean for a period of time due to the reverse flow air pulses generated from intake valve closing. In addition, since emission regulations have been implemented, the oil mist leaving the engine crankcase via the crankcase breather hose must be ducted into the carburetor, where it will be burned in the engine instead of being released into the atmosphere as a pollutant. This oil mist from the crankcase breather hose can also wet the filter media of the pleat block and cause it to plug prematurely.

One way to minimize the wetting of the filter media of the pleat block is to provide a baffle, sometimes referred to as a "spit-back cup", in front of the carburetor inlet and crankcase breather hose. The baffle blocks the fuel droplets flowing back out of the carburetor and the oil mist from the crankcase breather hose from reaching the filter element and provides a surface on which the fuel and oil can collect to form larger drops that will eventually flow back into the carburetor. The disadvantages of this design are the higher cost and larger size due to the extra parts of the baffle and a loss of engine power due to the air flow restriction imposed by baffle.

It would therefore be advantageous if a filter element could be designed that: (1) contained a seal bead that sealed the air filter and could be retained in the air filter base without requiring both a rib-like surface and an outer wall in the air filter base; and (2) that eliminated the need for a baffle. In particular, it would be advantageous if the filter element used the existing rib-like surface to both seal the air filter and retain the filter element within the air filter base, thereby eliminating the need for an extra outer wall in the air filter base, and contained a baffle integral to the filter element itself, thereby eliminating the need for the baffle in the engine.

SUMMARY OF THE INVENTION

The present inventors have discovered an air filter and air filter element design that eliminates the need for a baffle on the carburetor. The air filter element within the air filter contains an integral baffle which collects liquids that may be discharged from the carburetor and/or crankcase breather hose and protects the filter media of the pleat block in the filter element. Having the baffle as part of the filter element eliminates the need to have a baffle in the carburetor which reduces the cost and size of the carburetor and eliminates the loss of engine power that normally occurs due to the air flow restriction imposed by the baffle. In addition, the seal bead of the filter element contains a channel in which a sealing rib on the air filter base fits. This channel has an interference fit with the sealing rib on the air filter base, which allows the filter element to be retained during assembly without requiring an extra outer wall on the air filter base, thereby reducing the overall size of the air filter and simplifying the mold design for the air filter base. Finally, the air filter itself has an intake silencing chamber where external air is input and passed to the filter media of the filter element. The intake silencing chamber is sealed from outside air by the seal bead of the filter element thereby substantially reducing intake noise levels.

In particular, the present invention relates to a filter element for use in the air filter of an internal combustion engine that has a seal bead formed of an elastomeric material. The seal bead defines the outer circumference of the filter element and further defines a first area and a second area within the filter element. A filter media is molded into the seal bead within the first area of the filter element to filter incoming air. Finally, a baffle is located within the second area of the filter element to protect the filter media from wetting.

The present invention further relates to a filter element in which the seal bead that has a channel formed in one side and a surface formed on a second side, opposite the channel. The channel is used to retain the filter element during assembly and acts with the surface to seal the filter element within the air filter.

The present invention further relates to a filter element in which the seal bead further defines a third area within the filter element that creates a sealed flow path between an intake silencing chamber and the filter media to reduce intake noise levels.

The present invention further relates to an air filter for an internal combustion engine that has a base that includes a carburetor input formed in the base and a first sealing rib formed on the base. The air filter also has a cover that includes a second sealing rib formed on the cover. The second sealing rib has the same shape and size as the first sealing rib so that the sealing ribs are opposite each other when the base and cover are assembled. The air filter also has a filter element that has a seal bead formed of an elastomeric material. The seal bead defines the outer circumference of the filter element, which fits between the sealing ribs when the base and cover are assembled to seal the air filter, and further defines a first area and a second area within the filter element. A filter media is molded into the seal bead within the first area of the filter element to filter incoming air. Finally, a baffle is located within the second area of the filter, opposite the carburetor input, to protect the filter media from liquids from the carburetor input.

The present invention further relates to an air filter in which the seal bead of the filter element has a channel formed in one side that has an interference fit with the first sealing rib of the air filter base for retaining the filter element on the air filter base during assembly and sealing the filter element and the air filter base when the air filter is assembled. The seal bead also has a surface, opposite the channel, that is used to interface with the second sealing rib on the air filter cover to seal the filter element and the air filter cover when the air filter is assembled.

The present invention further relates to an air filter in which the intake silencing chamber is located to receive outside air before it is passed to the filter media and the seal bead further defines a third area within the filter element that creates a sealed flow path between an intake silencing chamber and the filter media to reduce intake noise levels.

DETAILED DESCRIPTION OF THE PREFERRED EMBODIMENT

Figure 1:
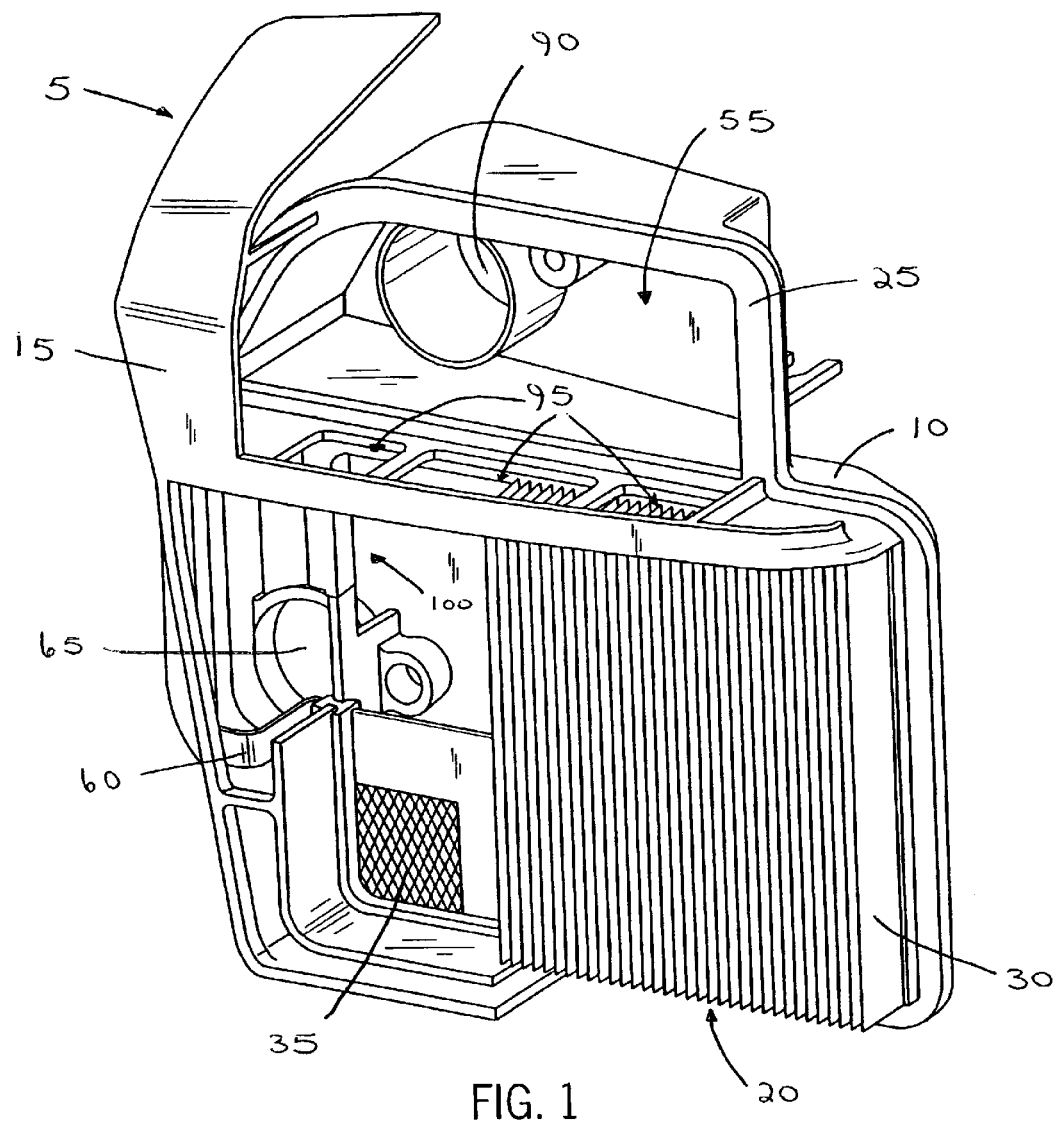
FIG. 1 is a cutaway perspective view of the preferred embodiment of an air filter with a filter element according to the current invention.
Figure 2:
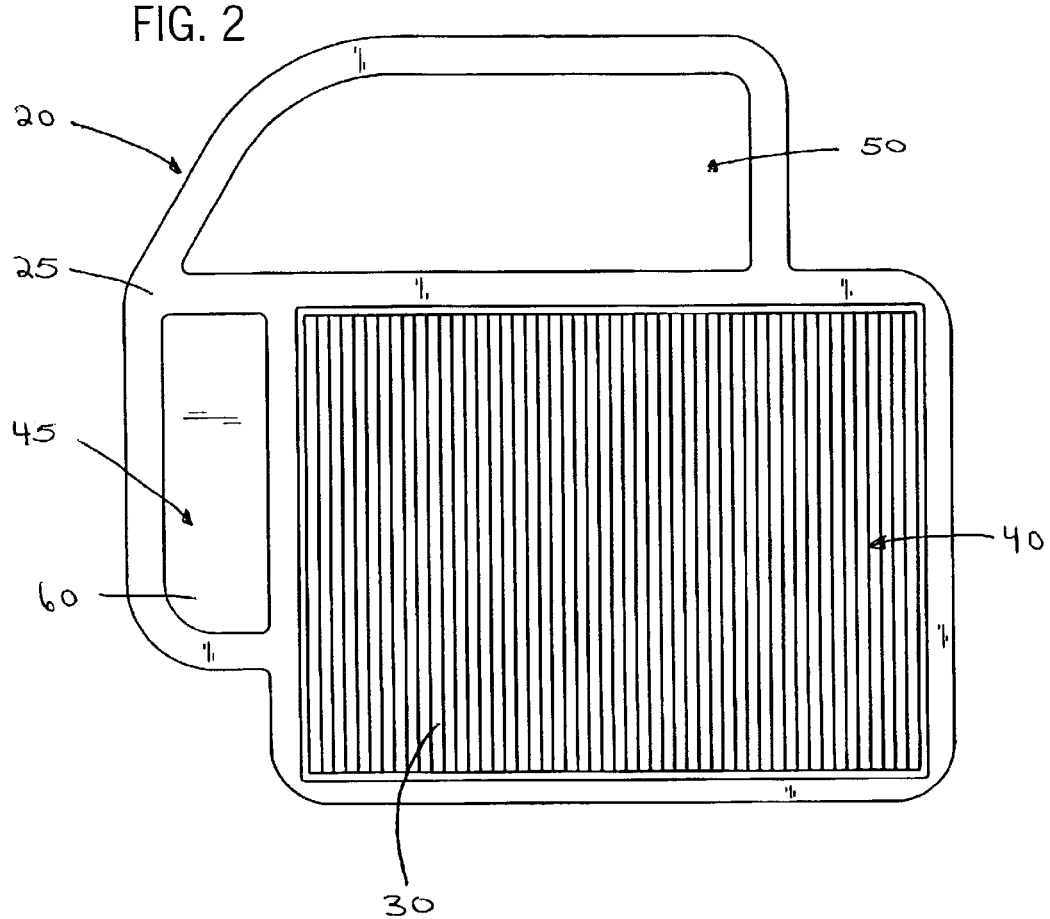
FIG. 2 is a side view of the preferred embodiment of air filter element of the current invention.

Referring to FIGS. 1 and 2, an air filter 5 and corresponding filter element 20 are shown, which are intended primarily for use with single cylinder utility engines. Although the description of the preferred embodiment below describes the invention as it would be used in a single cylinder utility engine, it will be understood by those skilled in the art that the air filter 5 and the filter element 20 of the current invention can be modified to be used with any type of engine that uses panel type filter elements.

Figure 3:
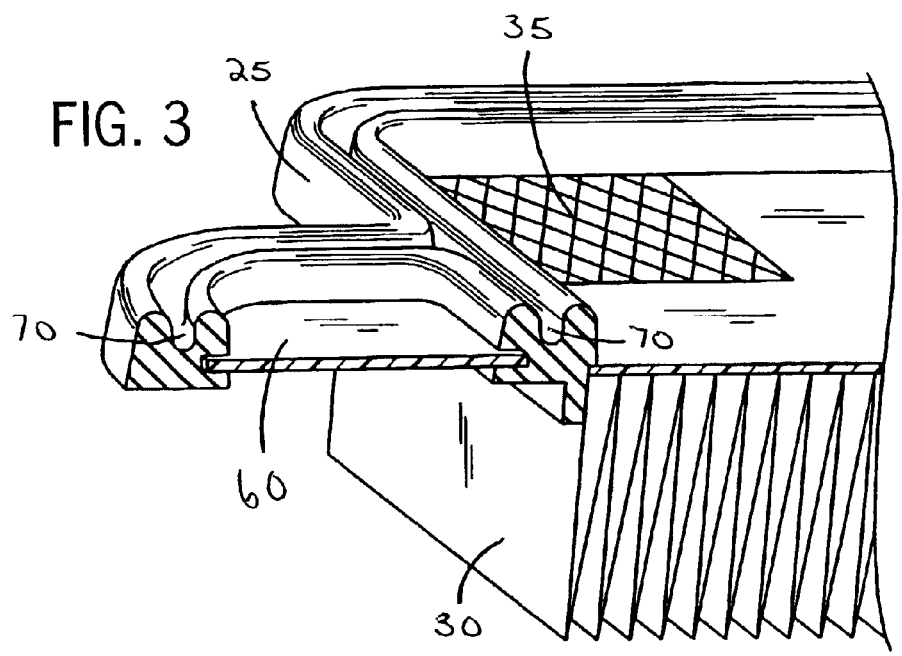
FIG. 3 is a cutaway perspective view of the preferred embodiment of the filter element of the current invention with a flat baffle insert.
Figure 4:
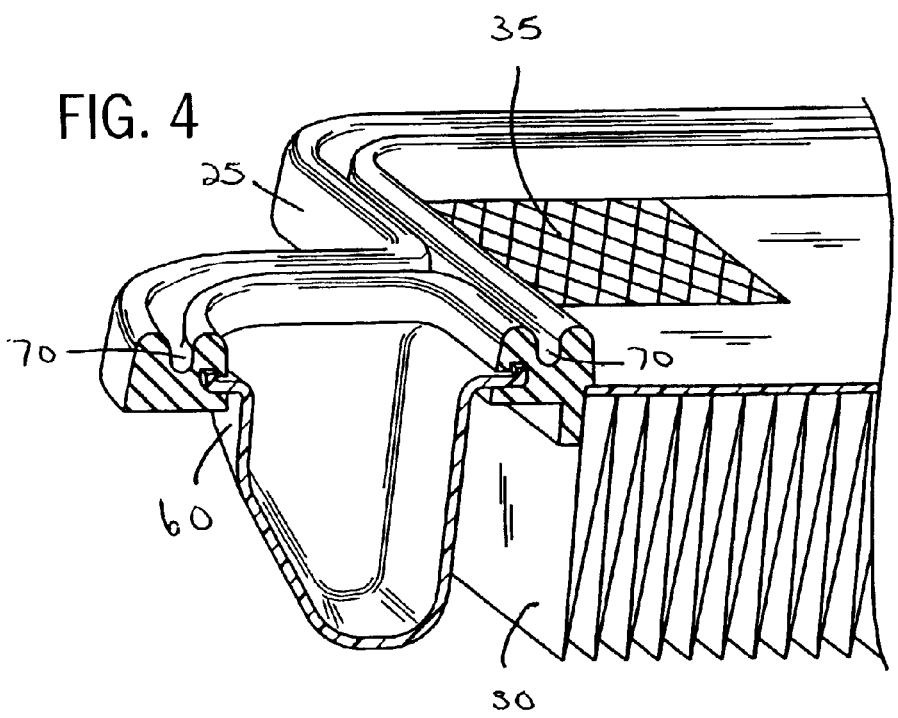
FIG. 4 is a cutaway perspective view of the preferred embodiment of the filter element of the current invention with a cupped baffle insert.
Figure 5:
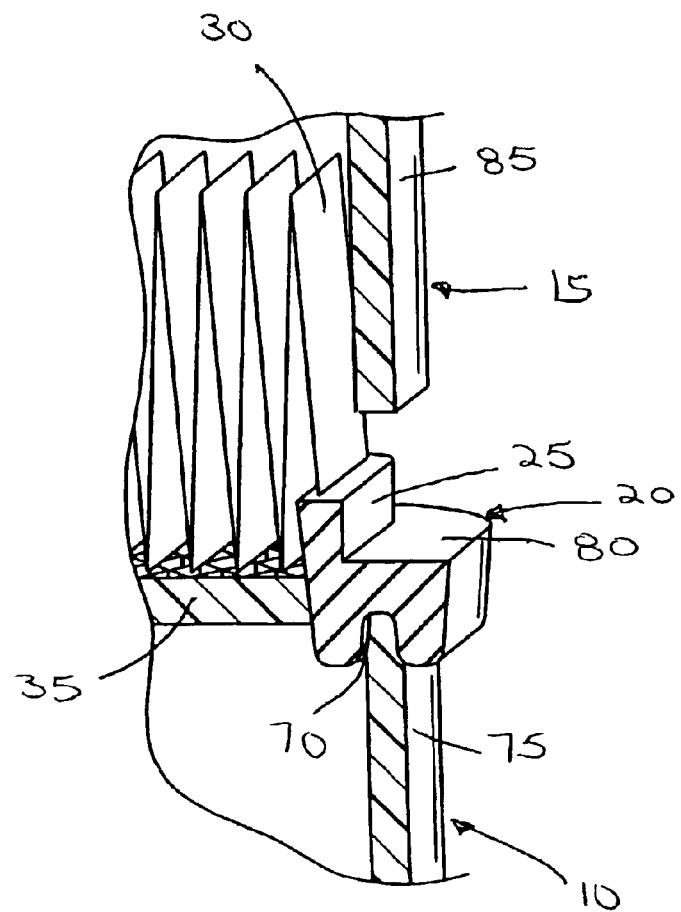
FIG. 5 is a cutaway perspective view of the seal bead of the preferred embodiment of the filter element of the current invention.

The filter element 20 of the current invention includes a seal bead 25, which is formed of an elastomeric material, such as urethane foam or plastisol, and creates the "frame" of the filter element 20. The seal bead 25 is also used to retain the filter element 20 when assembled to the air filter base 10 without the use of fasteners and to create a seal between the air filter base 10, the filter element 20, and the air filter cover 15, when the air filter 5 is completely assembled. As shown in FIGS. 3, 4, and 5, to retain the filter element 20 to the air filter base 10, a channel 70 is formed in the side of the seal bead 25 that faces the air filter base 10. A first sealing rib 75 is formed on the air filter base 10 and is inserted into the channel 70 when assembled. The channel 70 and the first sealing rib 75 are designed to have an interference fit, thereby retaining the filter element 20 to the air filter base 10 during assembly without the use of fasteners. The channel 70 and first sealing rib 75 also create a seal between the filter element 20 and the air filter base 10 when the air filter is completely assembled. To create a seal between the filter element 20 and the air filter cover 15, the seal bead 25 has a surface 80, opposite the channel 70, which faces the air filter cover 15 and is generally perpendicular to the channel 70 and the first sealing rib 75. A second sealing rib 85 is formed on the air filter cover 15, which is perpendicular to the surface 80 and parallel and directly opposite from the first sealing rib 75. When the air filter 5 is completely assembled, the seal bead 25 is "pinched" between the first sealing rib 75 and the second sealing rib 85, thereby completely sealing the air filter 5.

Furthermore, the seal provided between the channel 70 and the first sealing rib 75 ensures that all "clean" portions of the air filter 5 are within the air filter base 10 and are sealed from the "dirty" portions of the air filter 5. The "wraparound" nature of the first sealing rib 75 being contacted on 3 sides by the channel 70 (see FIG. 5) provides a more robust seal against dirt infiltration than the seal provided by the surface 80 and the second sealing rib 85, which provides the seal for the "dirty" portions of the air filter 5. While the seal provided by the surface 80 and second sealing rib 85 is generally effective, it does not provide as robust a seal as the provided by the channel 70 and the first sealing rib 75. In the event that the air filter 5 becomes loose or slightly damaged, dirt may leak past a seal such as that provided by the surface 80 and the second sealing rib 85. However, dirt would not leak past the seal provided by the channel 70 and the first sealing rib 75. Since the seal provided by the surface 80 and the second sealing rib 85 is used on the "dirty" portion of the air filter 5 only, no engine damage will occur if the air filter 5 should become loose or slightly damaged, short of the air filter 5 being destroyed or the air filter cover 15 and filter element 20 completely falling off of the engine.

In addition, the seal bead 25 is formed to define a first area 40, a second area 45, and a third area 50, within the outer circumference of the seal bead 10. The first area 40 is generally rectangular in shape, or could be any shape required to fit within the particular air filter, and contains a pleat block 30 which provides filtering of intake air that is to be provided to the carburetor. The pleat block 30 is a length of filter media, such as filter paper, cloth, or other fibrous material, that is alternately folded, or "pleated" to form a block that will fit within the first area 40. In the preferred embodiment of the invention, a pleat block is used because it provides a greater filter surface area in a small space. However, it will be understood by one skilled in the art that the filter media disposed within the first area 40 does not necessarily have to be a pleat block, but can be any filter media design, such as a flat portion of filter media, multiple layers of flat filter media, or a corrugated type filter, that will provide filtering of the intake air. The first area 40 may also include a screen 35, such as an expanded metal screen or molded plastic screen, that is placed adjacent to the pleat block 30 to provide rigidity and strength to the filter element 20. In the preferred embodiment of the invention, the pleat block 30 and the screen 35 are molded directly into the seal bead 25 and completely cover the first area 40. However, it will be understood by one skilled in the art that the pleat block 30 and the screen 35 could be secured to the seal bead 25 by any securing means, for example adhesive, fasteners, etc., so long as the first area 40 is completely covered by the pleat block 30 to provide complete filtering of the air passing through the first area 40.

The second area 45 contains a baffle 60, which is configured to be directly in front of the carburetor inlet 65. The baffle 60 prevents the pleat block 30 from getting wet from the "spit-back" of the carburetor and the oil mist from the crankcase breather hose by providing a surface for the liquids to collect on and be directed back to the carburetor for combustion. In the preferred embodiment of the invention, the baffle 60 is a separate part that is made of plastic, metal, or some other suitable material, that is molded into the seal bead 25, similar to the way the pleat block 30 and the screen 35 are molded into the seal bead 25. However, it will be understood by one skilled in the art that the baffle 60 can be formed directly into the filter element 20 out of the same material as the seal bead 25 if the material has enough strength to withstand the intake air pulsation from the carburetor. As shown in FIGS. 3 and 4, the shape of the baffle 60 depends on the design and function of the engine and can be as simple as a flat piece of material, as shown in FIG. 3, or can be a more complex shape, as shown in FIG. 4.

The third area 50 does not contain any filter media and is left open. The third area 50 interconnects an intake silencing chamber 55, which is formed in the air filter base 10, to the area that contains the pleat block 30. By having the intake silencing chamber 55 before the pleat block 30, and by creating a sealed flow path from the intake silencing chamber 55 to the pleat block by the seal bead 25, the air that is taken into the intake silencing chamber 55 is sealed from outside air, thereby substantially reducing intake noise levels of the air filter 5. It will be understood by one skilled in the art that the intake silencing chamber 55 does not have to be formed in the air filter base 10, but could be formed in the air filter cover 15, or in any other way desirable. The only requirement to substantially reduce the intake noise levels is that the intake silencing chamber 55 be located before the pleat block 30 and that there be a sealed flow path for the air from the intake silencing chamber 55 to the pleat block 30.

Referring now to FIG. 1, in operation, the air filter 5 pulls in air through an air inlet 90, which is formed in the air filter base 10, into the intake silencing chamber 55, which is used to reduce induction noise levels. From the intake silencing chamber 55, the air passes through the third area 50 defined by the seal bead 25, which forms a sealed flow path for the air, and through a plurality of openings 95. At this point, the intake air has not yet been filtered. The air then passes through the pleat block 30 and the screen 35, located in the first area 40 defined by the seal bead 25, where the air is then filtered. The filtered air then passes through a second opening 100 to the carburetor inlet 65, which is directly opposite from the baffle 60, and is supplied to the carburetor of the engine (not shown). Because the baffle 60 is directly in front of the carburetor inlet 65, rather than the pleat block 30, any spit-back from the carburetor or oil mist from the crankcase breather hose is collected on the baffle 60 instead of on the filter media of the pleat block 30.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

What is claimed is:

1. A filter element for use in an internal combustion engine, comprising:

a) a seal bead defining an outer perimeter of the filter element and at least two inner areas within the outer perimeter;

b) filter media disposed within one of the at least two inner areas; and c) a baffle disposed within another of the at least two inner areas.

2. A filter element, as recited in claim 1, wherein the filter media is a pleat block.

3. A filter element, as recited in claim 1, further comprising a stiffening member disposed within the same inner area as the filter media.

4. A filter element, as recited in claim 3, wherein the stiffening member is a screen.

5. A filter element, as recited in claim 1, wherein the seal bead defines a third inner area within the outer perimeter.

6. A filter element, as recited in claim 5, wherein the third inner area is substantially clear of obstructions and creates a sealed flow path for unfiltered air.

7. A filter element, as recited in claim 1, wherein the filter media is molded into the seal bead.

8. A filter element, as recited in claim 1, wherein the baffle is formed as an integral part of the seal bead.

9. A filter element, as recited in claim 1, wherein the baffle is molded into the seal bead.

10. A filter element, as recited in claim 1, wherein a channel is formed in a first side of at least a portion of the seal bead for receiving a sealing rib of a filter housing and retaining the filter element.

11. A filter element for use in an internal combustion engine, comprising:

a) a seal bead defining an outer perimeter of the filter element and at least three inner areas within the outer perimeter, wherein a channel is formed in a first side of at least a portion of the seal bead for receiving a sealing rib of a filter housing and retaining the filter element;

b) a pleat block molded into the seal bead within one of the at least three inner areas;

c) a screen molded into the seal bead within the same inner area as the pleat block;

d) a baffle molded into the seal bead within another of the at least three inner areas; and wherein e) the inner area not having disposed therein the pleat block or the baffle is substantially clear of obstructions and creates a sealed flow path for unfiltered air.

12. An air filter assembly for an internal combustion engine, comprising:

a) an air filter housing having a base and a cover, the air filter housing defining an air flow path from an air inlet to a carburetor inlet;

b) a first sealing rib formed on the base;

c) a second sealing rib formed on the cover;

d) a filter element, disposed within the air filter housing, including a seal bead defining an outer perimeter of the filter element, which engages the first sealing rib and the second sealing rib to seal the air flow path in the air filter housing, and further defining at least two inner areas within the outer perimeter;

e) filter media disposed within on of the at least two inner areas; and f) a baffle, disposed within another of the at least two inner areas, facing the carburetor inlet.

13. An air filter assembly, as recited in claim 12, wherein The filter media is a pleat block.

14. An air filter assembly, as recited in claim 12, further comprising a stiffening member disposed within the same inner area as the filter media.

15. An air filter assembly, as recited in claim 14, wherein the stiffening member is a screen.

16. An air filter assembly, as recited in claim 12, wherein the filter media is molded into the seal bead.

17. An air filter assembly, as recited in claim 12, wherein the baffle is formed as an integral part of the seal bead.

18. An air filter assembly, as recited in claim 12, wherein the baffle is molded into the seal bead.

19. An air filter assembly, as recited in claim 12, wherein a channel is formed in a first side of at least a portion of the seal bead for receiving the first sealing rib and retaining the filter element.

20. An air filter assembly, as recited in claim 12, wherein the seal bead defines a third inner area within the outer perimeter.

21. An air filter assembly, as recited in claim 20, wherein the third inner area is substantially clear of obstructions and creates a sealed flow path for unfiltered air.

22. An air filter assembly, as recited in claim 12, wherein the air filter housing includes an intake silencing chamber within the air flow path and upstream of the filter media.

23. An air filter assembly, as recited in claim 20, wherein:

a) the air filter housing includes an intake silencing chamber within the airflow path and upstream of the filter media; and wherein b) a first portion of the intake silencing chamber is disposed in the cover and a second portion of the intake silencing chamber is disposed in the base, wherein the third inner area is substantially clear of obstructions and the portion of the seal bead defining the third inner area engages between the first and second portions of the intake silencing chamber.

24. An air filter assembly for an internal combustion engine, comprising:

a) an air filter housing having a base and a cover, the air filter housing defining an air flow path from an air inlet through an intake silencing chamber to a carburetor inlet;

b) a first sealing rib formed on the base;

c) a second sealing rib formed on the cover;

d) a filter element, disposed with the air filter housing in the air flow path downstream of the intake silencing chamber, including a seal bead defining an outer perimeter of the filter element, which engages the first sealing rib and the second sealing rib to seal the air flow path in the air filter housing, and further defining at least three inner areas within the outer perimeter;

e) a pleat block molded into the seal bead within a first of the at least three inner areas;

f) a screen molded into the seal bead within the same inner area as the filter media; and g) a baffle molded into the seal bead within a second of the at least three inner areas, facing the carburetor inlet; wherein h) a channel is formed in a first side of at least a portion of the seal bead for receiving the first sealing rib and retaining the filter element; and i) a first portion of the intake silencing chamber is disposed in the cover and a second portion of the intake silencing chamber is disposed in the base, wherein the third of the at least three inner areas is substantially clear of obstructions and portion of the seal bead defining the third inner area engages between the first and second portions of the intake silencing chamber.

25. A method of operating an air filter between an air inflow passage and a carburetor inlet, the method comprising:

receiving air into a first chamber from the air inflow passage;

filtering the received air by passing the received air through a filter and through a first orifice formed in a frame, wherein the filter is disposed within the first orifice and supported by the frame;

communicating the filtered, received air to the carburetor inlet; and collecting an impurity on a baffle disposed within a second orifice formed in the frame, wherein the baffle is positioned in front of the carburetor inlet.

26. The method of claim 25, wherein the impurity is one of spit-back from the carburetor inlet and oil mist from a crankcase breather hose, and wherein the filter includes a pleated material.

27. The method of claim 25, wherein the received air passes into the first chamber from the air inflow passage by way of a third orifice formed in the frame.

* * * * *